Dec. 17, 1968   H. J. JENSEN ET AL   3,416,383
POWER TRANSMISSION BELTS
Filed Aug. 26, 1966

INVENTORS
HOWARD J. JENSEN
KENNETH D. RICHMOND
ALDEN W. BROOKS
BY DALE L. WAUGH

Reuben Wolk
ATTORNEY

United States Patent Office 3,416,383
Patented Dec. 17, 1968

3,416,383
POWER TRANSMISSION BELTS
Howard J. Jensen, Springfield, Kenneth D. Richmond, Nixa, and Alden W. Brooks and Dale L. Waugh, Springfield, Mo., assignors to Dayco Corporation, Dayton, Ohio, a corporation of Delaware
Filed Aug. 26, 1966, Ser. No. 575,279
6 Claims. (Cl. 74—233)

ABSTRACT OF THE DISCLOSURE

A V-belt having laminated sections in the compression or tension section, or both, in which the sections comprise alternate layers of fabric and elastomeric material. The elastomeric material has fibers embedded therein.

This invention relates to power transmission to belts which are used for the transmittal of power from one pulley to the other. More specifically, the belts referred to in the present application have a trapezoidal cross section and are also known as V-belts.

Designers of transmission belts are engaged in a never-ending battle to achieve a compromise between a belt which resists excessive wear, and yet is sufficiently flexible to pass over the pulleys during operation without undue stress. There have been many approaches toward the ideal solution to these problems, and the present invention reflects a novel approach in the development of a belt which provides a good compromise solution to these problems. The type of belt which will be referred to in the present application is one which is partially or wholly built up of a series of laminations or layers, offering additional advantages to the belt builder. These lamintaed belts have been found to reduce noise and vibrations, eliminate whipping and flipover, and ride properly in the pulleys. The use of these laminations is known in the prior art, but the present invention offers an improvement over the other laminated belts heretofore developed. At the same time the present invention utilizes another known principle for providing stiffer compounds; namely, the addition of a plurality of discrete fibers within the rubber stock to provide this stiffening. The use of this principle was set forth many years ago in applicants' assignee's Patents No. 1,611,830 and 1,700,999, in which these fibers were aligned transversely to the longitudinal axis of the belt to provide maximum stiffness. The present invention concerns itself with the combination of these fiber-reinforced compounds and fabric to provide an improved laminated belt.

In the past, the use of fibers was primarily to provide lateral stiffness in the belt, and thus the fibers were located at 90 degrees to longitudinal axis. It has now been found that changing this angle will reduce lateral stiffening and provide a slight amount of longitudinal stiffening. Thus, the fibers may be placed at an angle of between 45 and 90 degrees to the longitudinal axis of the belt. It has also been found that the placing of layers having the fibers at opposite angles would provide certain additional benefits.

The principal object of this invention, therefore, is the development of a belt having a high degree of stiffness combined with flexibility.

It is a further object to provide such a belt which has the effect of reducing noise, flipover, vibration and whipping and which provides a better engagement within the pulley.

It is a further object to provide a belt having a lateral stiffness combined with a slight amount of longitudinal stiffness.

These and other objects of the invention will be more fully described in the following specification and claims, in which:

Figure 1:
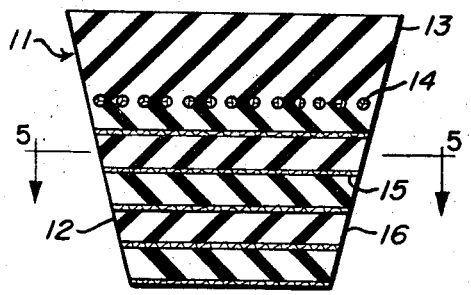
FIGURE 1 is a cross-sectional view of a belt embodying one form of the invention.

Referring now to the drawings, FIGURE 1 illustrates a typical belt 11 having a compression section 12 and a tension section 13, between which are embedded a plurality of cord windings 14 which extend longitudinally of the belt. In this form of the invention the tension section is composed of a conventional rubber material, but the compression section is laminated of alternate layers of rubber and fabric illustrating the principal feature of the invention. The fabric layers 15 may be made of woven material such as cotton, rayon, nylon, polyester, or the like, and may either be untreated or coated with rubber on one or both sides. In FIGURE 1 there are five fabric layers illustrated, but there may be anywhere between one and six layers according to the dimension of the belt and other requirements. The elastomeric layers 16 which are laminated between the fabric layers are composed of natural or synthetic rubber such as conventionally used in the art of belt building, but in addition have a plurality of discrete fibers embedded therein, these fibers extending transversely of the belt (that is 90 degrees to the longitudinal axis of the belt). These fibers which are designated by reference numeral 17 may be made of cotton, rayon, nylon, polyester, or other suitable materials, and are compounded in the rubber during the processing under controlled conditions which cause them to become aligned as indicated.

As another variation of this invention, the fabric layers 15 may be composed of a "stress-relieved" fabric in which the warp and weft threads are not disposed at a 90 degree angle with each other as is common, but are disposed at an angle of between 95 and 155 degrees with each other, when viewed in the direction of the longitudinal axis of the belt.

Figure 2:
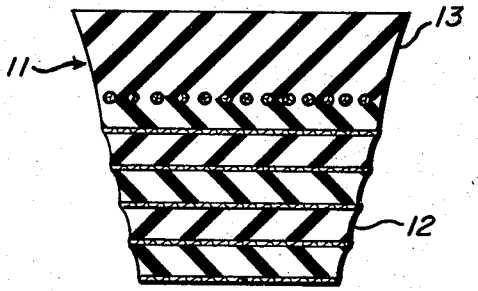
FIGURE 2 is a view similar to FIGURE 1 illustrating the wear which takes place after the belt has been operated.

During the operation of the belt the rubber layers 16 will tend to wear faster than the fabric layers 15, thus creating a slightly concave or dishing effect on the rubber as shown in FIGURE 2. This illustrates one of the advantages of laminated belts, since the edges of the fabric layer remain at approximately their original dimension to provide continued lateral contact with the pulley walls. If these fabric layers were not present the entire compression section would be dished out as the tension section has been, thus reducing the amount of pulley contact.

Figure 3:
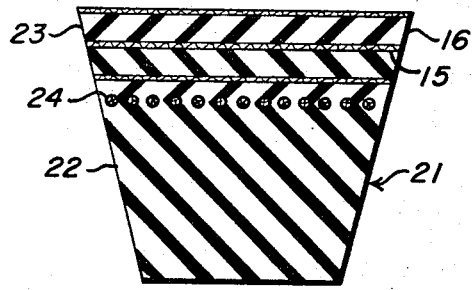
FIGURES 3 and 4 are views similar to FIGURE 1 illustrating a modified form of the invention.

FIGURE 3 illustrates a form of the invention in which a belt 21 is designed with a compression section 22 and a tension section 23, between which are embeded cord windings 24. In this case, however, the tension section is laminated and formed of alternating fabric layers 15 and elastomeric layers 16, both formed in a manner similar to that described above. Although three layers of fabric and elastomeric material have been illustrated in this figure, it is also possible to utilize anywhere between one and six layers while utilizing conventional elastomeric material for the remainder of the tension section.

Figure 4:
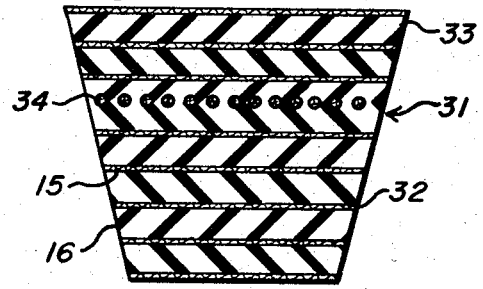

FIGURE 4 illustrates a form of the invention in which a belt 31 consists of compression section 32 and tension section 33 having cord windings 34 embedded therebetween. In this case the entire compression and tension sections are illustrated as being formed of laminated layers of fabric 15 and elastomeric material 16 formed as described above. It is also understood, of course, that each of the tension and compression sections may be comprised only partially of the laminated layers however, and that the remaining portions may be formed of conventional elastromeric material.

Figure 5:
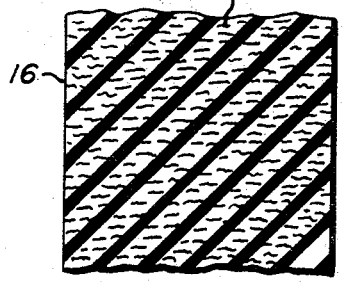
FIGURE 5 is a sectional view of a typical compounded layer taken along the lines 5—5 of FIGURE 1.
Figure 6:
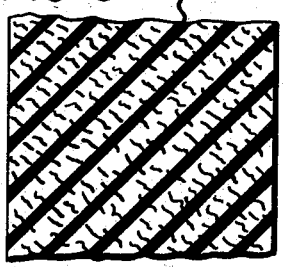
FIGURES 6 and 7 are views similar to FIGURE 5 illustrating modified forms of layers.
Figure 7:

The fibers incorporated in the elastomeric layers have heretofore been shown as in FIGURE 5, as being located at approximately 90 degrees to the longitudinal axis of the belt in order to provide maximum lateral stiffness. However, it is possible that in some instances one may not require quite as much lateral stiffness but may desire a slight amount of longitudinal stiffness. In this instance, it is possible to control the formation of the section in such a manner that the fibers are disposed at an angle to the longitudinal axis that is anywhere between zero and 90 degrees. These fibers may be disposed in one direction as designated by section 18 in FIGURE 6, or in the other direction as shown by section 19 in FIGURE 7. As a general rule, maximum lateral stiffness is achieved when the fibers are at an angle of 90 degrees to the longitudinal axis. However, there are times when a limited longitudinal stiffness is desired to minimize flipover and to prevent ripples in the belt, and this can be achieved by the different angles referred to.

Figure 8:
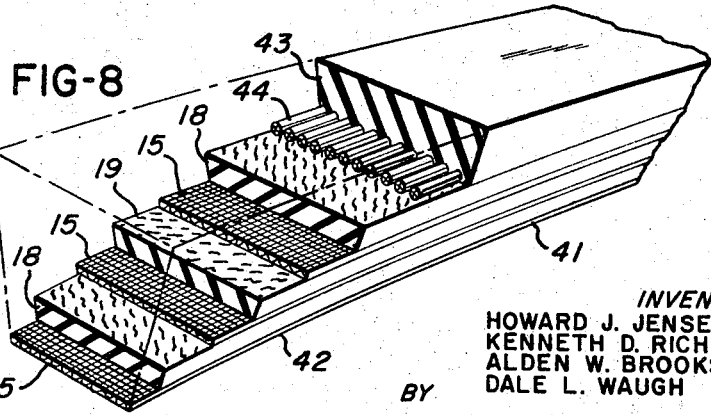
FIGURE 8 is a perspective view in partial section illustrating another form of the invention.

As described above, any of the sections 16 may be replaced by the sections 18 or 19 which are meant to represent fibers at any desired angle, and in which all the fibers are extending in the same direction. It is also possible, however, to alternate layers 18 and 19 so that the fibers in alternate layers will extend in opposite directions, or cross angles, in order to achieve an even better comprise between stiffness and life. Such a construction is illustrated in FIGURE 8 in which the belt 41 is shown as having a compression section 42 and a tension section 43, with cord windings 44. The compression section is composed of a series of layers of fabric 15 alternating with elastomeric sections 18 and 19 as shown.

The above forms of the invention are typical of many combinations which are utilized to achieve the novel effect. These are not meant to be limiting, however, and other modifications are anticipated as falling within the scope of the invention.

We claim:
1. A V-belt having a body comprised of compression and tension sections and a plurality of longitudinally extending cord windings embedded between said sections, said body having laminated sections comprising alternate layers of fabric and elastomeric material, said elastomeric material having a plurality of discrete fibers embedded therein.

2. A belt according to claim 1 in which said layers are located in said tension section.

3. A belt according to claim 1 in which said layers are located in said compression section.

4. A belt according to claim 1 in which said fabric layers have warp and weft threads which are disposed at an angle of between 95 and 155 degrees with each other.

5. A belt according to claim 1 in which said fibers are disposed at an angle of between 45 and 90 degrees to the longitudinal axis of the belt.

6. A belt according to claim 5 in which alternate layers of elastomeric material have fibers oppositely angularly disposed to each other.

References Cited

UNITED STATES PATENTS

| | | | |
|---|---|---|---|
| 2,519,590 | 8/1950 | Mitchell | 74—233 XR |
| 2,631,463 | 3/1953 | Waugh | 74—233 |
| 2,642,751 | 6/1953 | Freedlander | 74—233 |
| 2,711,778 | 6/1955 | Waugh | 74—233 |
| 3,051,212 | 8/1962 | Daniels | 74—233 XR |

FRED C. MATTERN, Jr., *Primary Examiner.*

J. A. WONG, *Assistant Examiner.*